(12) United States Patent
Doffing et al.

(10) Patent No.: US 8,146,131 B2
(45) Date of Patent: *Mar. 27, 2012

(54) UNIQUE PRODUCTION FORUM

(75) Inventors: John P. Doffing, Minneapolis, MN (US); Mary Ryan, Stillwater, MN (US); Scott Emkovik, Cannon Falls, MN (US); Paul Volker, Andover, MN (US)

(73) Assignee: The Runway Club, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/766,303

(22) Filed: Apr. 23, 2010

(65) Prior Publication Data

US 2010/0202751 A1    Aug. 12, 2010

Related U.S. Application Data

(63) Continuation of application No. 11/463,336, filed on Aug. 9, 2006, now Pat. No. 7,707,616.

(51) Int. Cl.
*H04N 7/173* (2011.01)
*H04N 7/16* (2011.01)

(52) U.S. Cl. .......................... 725/142; 725/86

(58) Field of Classification Search .................. None
See application file for complete search history.

(56) References Cited

U.S. PATENT DOCUMENTS

| | | | |
|---|---|---|---|
| 7,280,975 B1 | 10/2007 | Donner | |
| 7,707,616 B2 | 4/2010 | Doffing et al. | |
| 2002/0199198 A1 | 12/2002 | Stonedahl | |
| 2003/0112354 A1* | 6/2003 | Ortiz et al. | 348/333.01 |
| 2003/0194211 A1* | 10/2003 | Abecassis | 386/69 |
| 2004/0001079 A1* | 1/2004 | Zhao et al. | 345/719 |
| 2004/0068758 A1* | 4/2004 | Daily et al. | 725/136 |
| 2004/0226048 A1* | 11/2004 | Alpert et al. | 725/109 |
| 2005/0086687 A1* | 4/2005 | Omoigui | 725/35 |
| 2006/0193502 A1* | 8/2006 | Yamaguchi | 382/118 |
| 2007/0008131 A1* | 1/2007 | Doan et al. | 340/572.1 |
| 2008/0046957 A1 | 2/2008 | Doffing et al. | |

OTHER PUBLICATIONS

"U.S. Appl. No. 11/463,336 Notice of Allowance Mailed Dec. 9, 2009", 7.
"U.S. Appl. No. 11/463,336, Non-Final Office Action mailed May 12, 2009", 10 pgs.
"U.S. Appl. No. 11/463,336, Response filed Sep. 25, 2009 to Non Final Office Action mailed May 12, 2009", 6 pgs.

* cited by examiner

*Primary Examiner* — Joseph P Hirl
*Assistant Examiner* — An Nguyen
(74) *Attorney, Agent, or Firm* — Schwegman, Lundberg & Woessner, P.A.

(57) ABSTRACT

A method of producing an audio/video format recording in a venue includes correlating multiple unique viewing position in the venue to viewers. An event is then recorded the venue that viewers are attending. Multiple custom versions of recordings or productions are created corresponding to the viewers. Such custom versions are then made available to corresponding viewers.

11 Claims, 5 Drawing Sheets

UNIQUE PRODUCTION FORUM

RELATED APPLICATIONS

This application is a Continuation of U.S. application Ser. No. 11/463,336, filed on Aug. 9, 2006, and issued on Apr. 27, 2010 as U.S. Pat. No. 7,707,616, which is incorporated herein by reference in its entirety.

BACKGROUND

Live entertainment events occur in multiple different forums or venues today. Many times, a viewer may buy a ticket to experience the event, with or without an assigned seat. The viewer may even decide to buy a recording of the event. The event may be recorded in audio and/or video formats. Multiple different cameras may be used to provide footage for mixing into a master recording of the event. Usually, only one recording of the event is available for purchase, and it may or may not be a good representation of the viewer's experience of the event.

DETAILED DESCRIPTION

Figure 1:
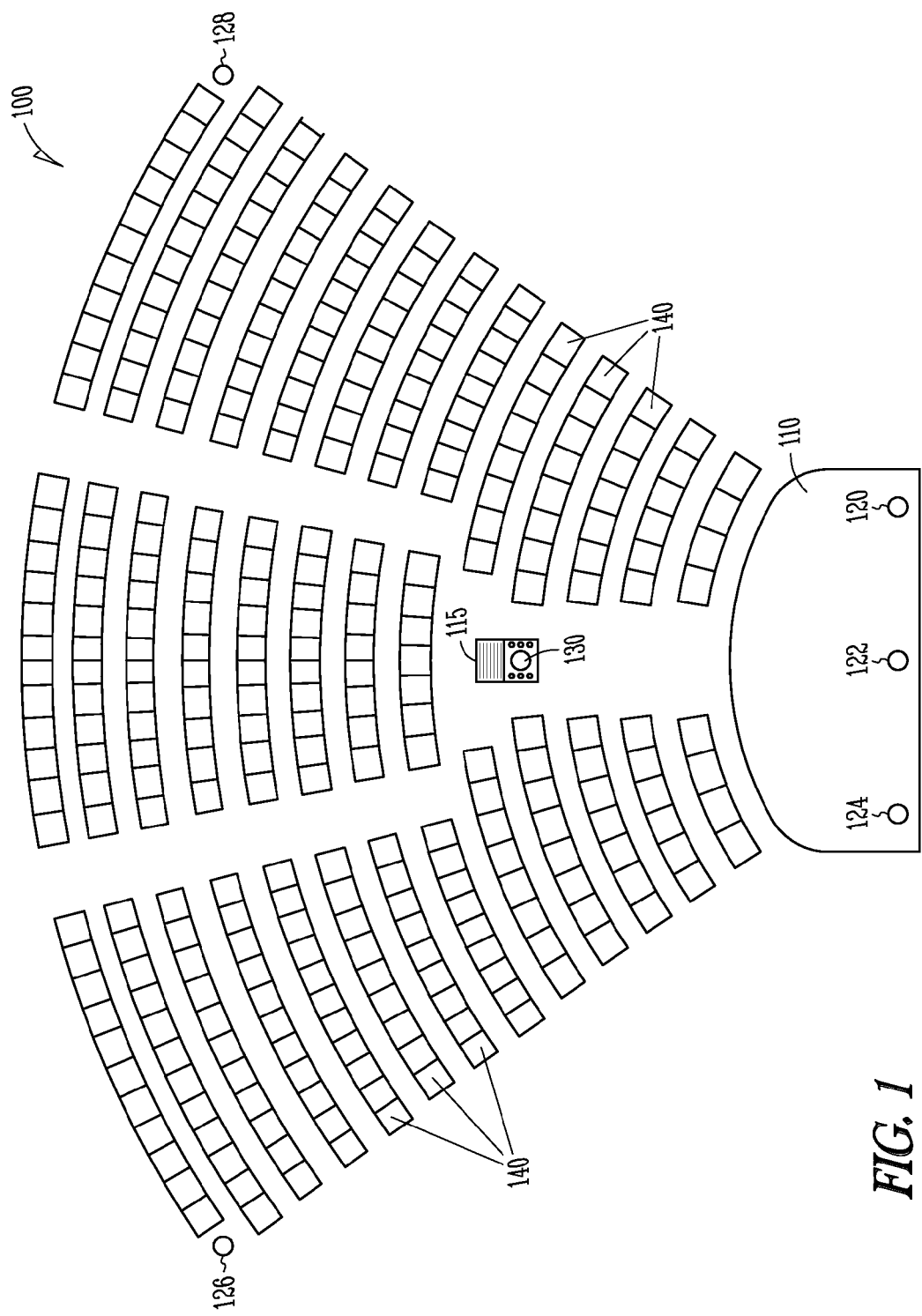
FIG. 1 is a block diagram of an event venue according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wireless transmissions. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

A viewer of an event is included in a production tailored for such viewer. In one embodiment, a viewer purchases a ticket with a corresponding unique identifier that identifies the viewer, and the location of a seat or other area of a venue or forum where the viewer will be watching the event. In further embodiments, the viewer may be otherwise identified in the venue, such as by facial recognition or RF tags, or other technology allowing identification of the location of the viewer. Footage of the event is taken that includes the viewer as a function of the location of the viewer. Such footage may be integrated into one or more productions or recordings of the event and made available for purchase by the viewer.

In further embodiments, the recordings may be tailored to provide similar views of the event as experienced by the viewer, to provide a recording that more accurately reflects the experience of the viewer during a live event. Thus, multiple different recordings or productions of the event will be available to the viewer for purchase following the event. In further embodiments, the productions may be influenced by viewer selections. For instance, the viewer may specify the amount of footage that the viewer appears in, may specify how much the viewer would like to the recording to minor their experience, or may specify the desire for a version created to best capture the event without regard or with little regard for the actual position of the viewer during the event. Thus, the user may choose between unique productions for the viewer and "produced" versions by experts in some embodiments.

The following describes a typical combined forum and production studio with live audience. Methods for identifying viewers and preparing productions of events that may be unique to the viewers is also described, as well as method of purchasing such productions.

FIG. 1 is a block diagram of an event venue indicated generally at 100 according to an example embodiment. Venue 100 in various embodiments includes a stage 110, controls 115 and various cameras 120, 122, 124, 126, 128 and 130 and microphones for recording the event. Various viewing locations 140, (just a few called out with the reference number) such as seats, benches, standing areas, etc., may be dispersed throughout the venue. In some embodiments, the viewing locations may comprise dining tables directly in the venue or behind transparent barriers on the periphery of the venue with corresponding audio provided. Video monitors may also be provided at various locations within the venue.

Controls 115 may be used to control lighting, speakers, microphones, cameras and other production equipment. Recording of multiple channels of audio and video may also be controlled by controls 115. The cameras may be positioned anywhere in the venue and may be supported by the floor, ceiling or walls in various embodiments. The number and placement of the cameras, audio recording equipment and video monitors is unlimited except for physical space or other practical considerations, and may be optimized for acoustic and visual properties of the venue to provide the best sound/video obtainable.

Placement of the cameras may also be done to obtain multiple different views from various pre-selected sections of the audience. Further, cameras may be moved as desired to obtain views of an event performance from a specified seat location. The cameras may be moved prior to or during the event. They may be mounted on movable booms, or travel on cables, or any other methods available now or in the future. Footage may be marked or notated to indicate affinity with a particular location in the form. This may be done via headers in digital representations of the film, or in separate logs corresponding to analog recording from specific cameras with time, date and camera stamps. Further, the location of the camera may also be logged to better identify footage with particular locations and perspectives of the stage.

Figure 2:
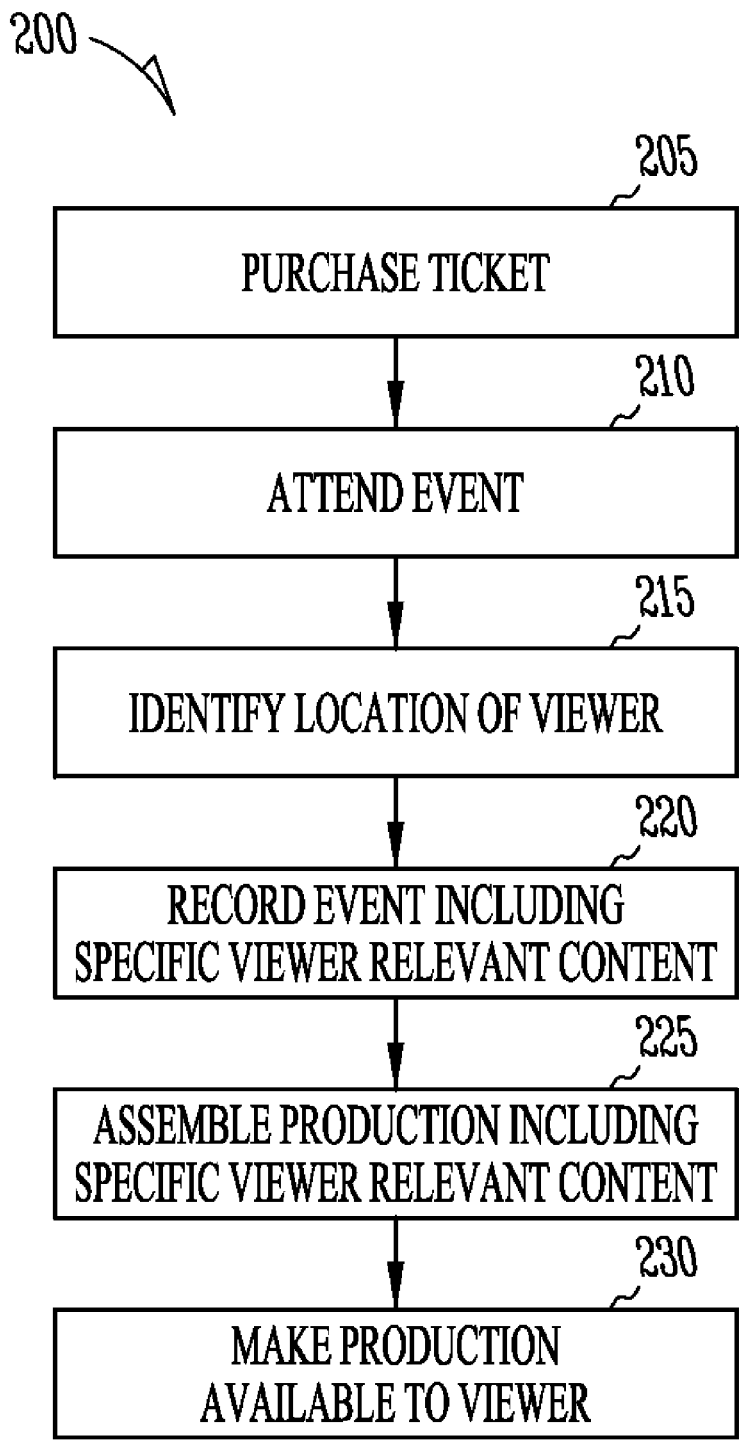
FIG. 2 is a flow chart indicating a process for identifying, attending and purchasing productions of events according to an example embodiment.

FIG. 2 is a flow chart 200 indicating a process for recording an event attended by a viewer, and including viewer relevant content in a production which may be made available to the viewer. In one embodiment, a potential viewer may review listings of events, such as from a website, and decide to purchase a ticket at 205 to attend the event. The purchase may be made via a network, website, telephone, in person, or other means of obtaining a ticket for a desired event. The ticket may identify a specific seat from which to view the event. The ticket may have a unique identifier that identifies the viewer and allows association of the viewer with the event and optionally the viewing location of the viewer during the event.

At 210, the viewer attends the event, either sitting in the specific seat, or location, or perhaps carrying an RFID tag that allows location of the viewer during performance of the event at 215. Other means of identifying the viewer during the event may also be used, such as facial recognition or other type of transponder that allows location of the viewer. In an alternative embodiment, the viewer may provide a webcam feed to the venue from a remote location. Images of the viewer may be displayed on one or more video monitors, such as large flat screens, which may also be incorporated into the production.

At 220, the event is recorded using one or more of the cameras and microphones illustrated in FIG. 1. The cameras and other recording devices may include specific viewer relevant content, such as footage of the viewer watching the event, footage from a similar perspective corresponding to the viewer location, or footage that complements the original view of the viewer, providing a different angle of a performance than that seen live by the viewer. This viewer relevant content may be obtained as a function of the viewer location, in addition to other footage that may normally be taken. There may be multiple viewers for which viewer relevant content may be obtained, providing the ability to obtain unique footage for each viewer of the event.

At 225, the footage is assembled into one or more productions that may include specific viewer relevant content. One production may be unique for a particular viewer. In some embodiments, each viewer may have an associated list of preferences for a production, such as prefers front views of performance, likes side views, likes close-ups on certain performers in a group, etc. These preferences may carry over from performance to performance, or may be specified when purchasing a ticket for an event. Still further, the viewer may not even desire to attend the event, but merely provide preferences for a production of the event. The preferences can be used to assemble a potentially unique production for the viewer. Such production is made available to the viewer at 230, such as by distribution of physical media containing the production, or downloading via a network, or distribution in any other desired manner. Access to the production may be provided in reference to the unique identifier or simply by browsing one or more available productions. In one embodiment, a unique production may only be assembled on specific request by a viewer with or without pre-payment. Viewer preferences may be modified prior to such an on-demand unique production is assembled. In further embodiments, the same production may be made available to others for viewing and/or purchase.

In an alternative embodiment, the viewer may provide a webcam feed to the venue from a remote location. Images of the viewer may be displayed on one or more video monitors, such as large flat screens, which may also be incorporated into the production. In further embodiments, the webcam feed itself may be incorporated into the production. The viewer would then be able to download a production with their remote image of themselves or other desired objects included in the performance.

Figure 3:
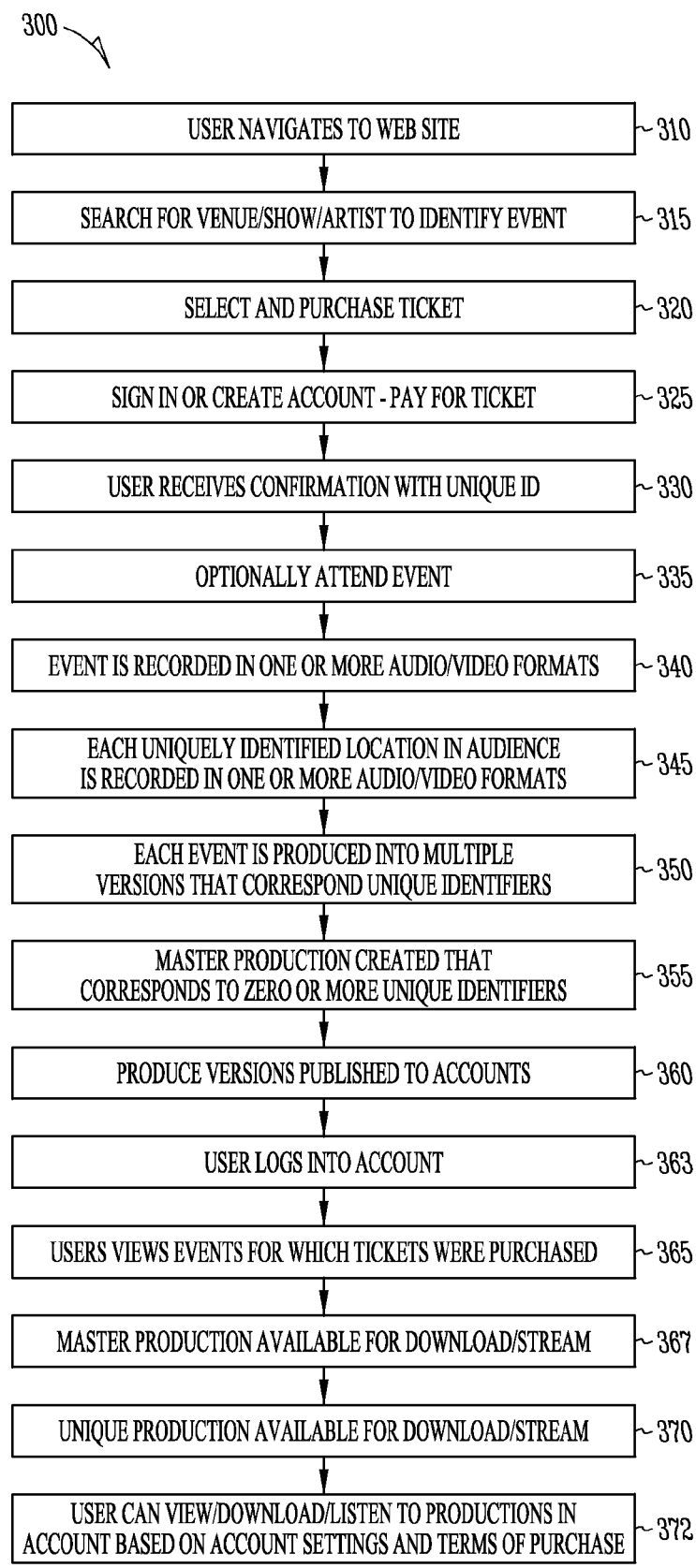
FIG. 3 is a process overview including production and other post event activities according to an example embodiment.

FIG. 3 is a more detailed process overview 300 of user interactions with a web site, including production and other post event activities according to an example embodiment. Some of the elements of process 300 include user actions, programmed computer actions, and actions performed during an event that is recorded. The entity performing the actions is apparent from the context of the process flow.

At 310, a user navigates to a website that contains information about events at one or more venues. The venues may be combined restaurant and entertainment centers, which may include one or more production/viewing facilities as described above. In one embodiment, the venues may be located proximate airports, and may have themes that are consistent with local culture. The events at the venues may also have a local culture aspect, or may be any type of event desired, such as a concert, play, comedy act, etc. Some events may be performed by professionals, while others may be performed by local organizations, such as schools, clubs, churches, or other local or remote groups. There may or may not be a charge to the performers for use of the production facilities. Further, some performers may be paid, with recovery of payments from tickets sold and/or production purchases by viewers or other users.

At 315, the user searches for a venue/show/artist to identify an event, and may select and purchase a ticket at 320. The user may be able to use a ticket wizard to identify a desired number and location of tickets. The user may then be prompted to sign in, or create an account to pay for the ticket. The ticket may be printed by the user, mailed to the user or held for pickup at the venue as desired. The user receives a confirmation via email or other means that confirms the purchase, and also includes a unique identifier. The unique identifier or ID, may include a seat location, an RFid, or associate the use of some other tracking technology provided to ticket holders upon entry into an event to be used for creation of custom productions. The user may optionally attend the event as indicated at 335.

At 340, the event may be recorded in one or more audio/video formats. Many such formats are known, and may exist in the future. Each unique location in the audience that has a unique ID associated with it, is also recorded in one or more audio/video formats at 345. At 350, the event may be produced into multiple versions that correspond to the unique IDs. Different methods of doing so are discussed above, and may include actual footage of the location, or other views that correspond to user preferences identified in their account, or during the purchase of the ticket or tickets for the event. At 355, a master production may be created that corresponds to zero or more unique IDs. The productions may be published to corresponding user accounts, or otherwise made available to users at 360.

At 363, a user may log into their account, and view events for which tickets were purchased at 365. The master production of the event is available for stream/download in one or more audio/video formats at 367, as is the production corresponding to the unique ID at 370. At 373, a user can view/download/listen to available productions in their account based upon account settings and terms of purchase. In one embodiment, an account may different permissions for viewing. A user may have already entered a credit card number and authorized debit of it upon viewing or streaming content. Further users may not have such permissions until they also provide a valid credit card number or other form of payment. Other forms of permissions may be granted based on any number of different conditions, such as available bandwidth, length of time as a customer, number of events attended, releases signed, agreement with terms and conditions, and past history of interactions.

Figure 4:
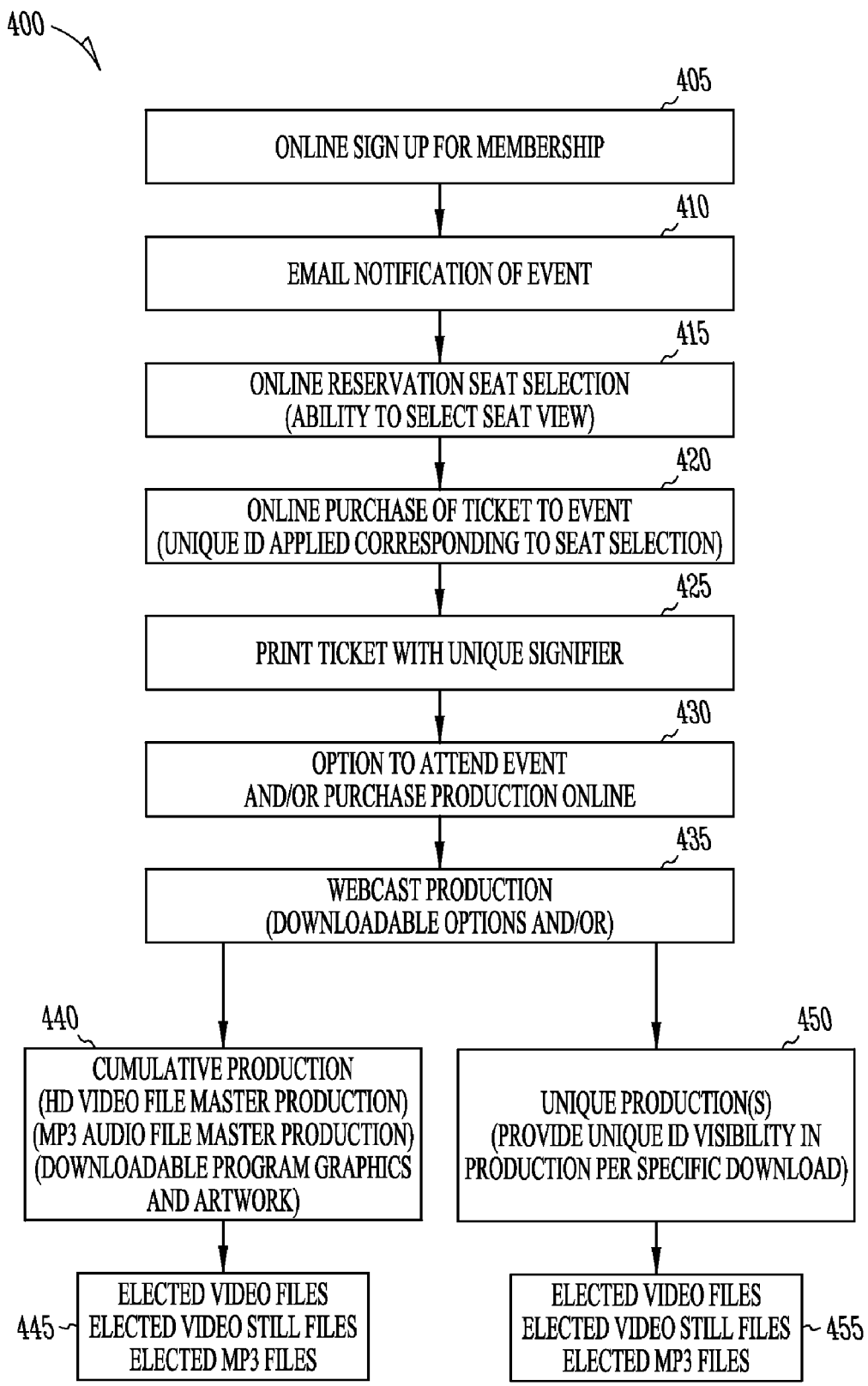
FIG. 4 is a production overview process according to an example embodiment.

An alternative process for creating unique productions of events is illustrated generally at 400 in FIG. 4. At 405, a user may sign up online for a membership with a coordinating entity that owns or schedules events at one or more venues. The venues may be owned by one or more other entities, or a single entity may own multiple venues. The coordinating entity may sent email notifications of events as desired at 410. The coordinating entity may also make online reservations for events available to users as indicated at 415. The online reservations may provide the user the ability to select seats, and even provide a view of a stage within the venue that approximates the view from the selected seat or seats.

When a user purchases a ticket to the event at 420, a unique identifier may be associated with the ticket, or included on the ticket for ease of reference by the user. The ticket may be printed at 425, local to the user, faxed to the user, mailed to the user or made available for the use to pick up at a will call window at the venue. The user may optionally attend the event at 430, and/or purchase a production online from the coordinating entity after the event has been recorded.

At 435, one or more webcast productions are created with downloadable options. The webcast productions may include a cumulative production at 440 which may include a HD (high definition) vide file master production, MP3 audio file master production and downloadable program graphics and artwork. The cumulative production is formed from different available files at 445, such as elected video files, elected video still files and elected MP3 files. The webcast productions may also include one or more unique productions 450. These productions may include unique identifier visibility in a production, based upon footage that is taken to specifically include shots of the location corresponding to the location associated with the unique ID. The unique productions may be created from different available files at 455, such as elected video files, elected video still files and elected MP3 files.

Figure 5:
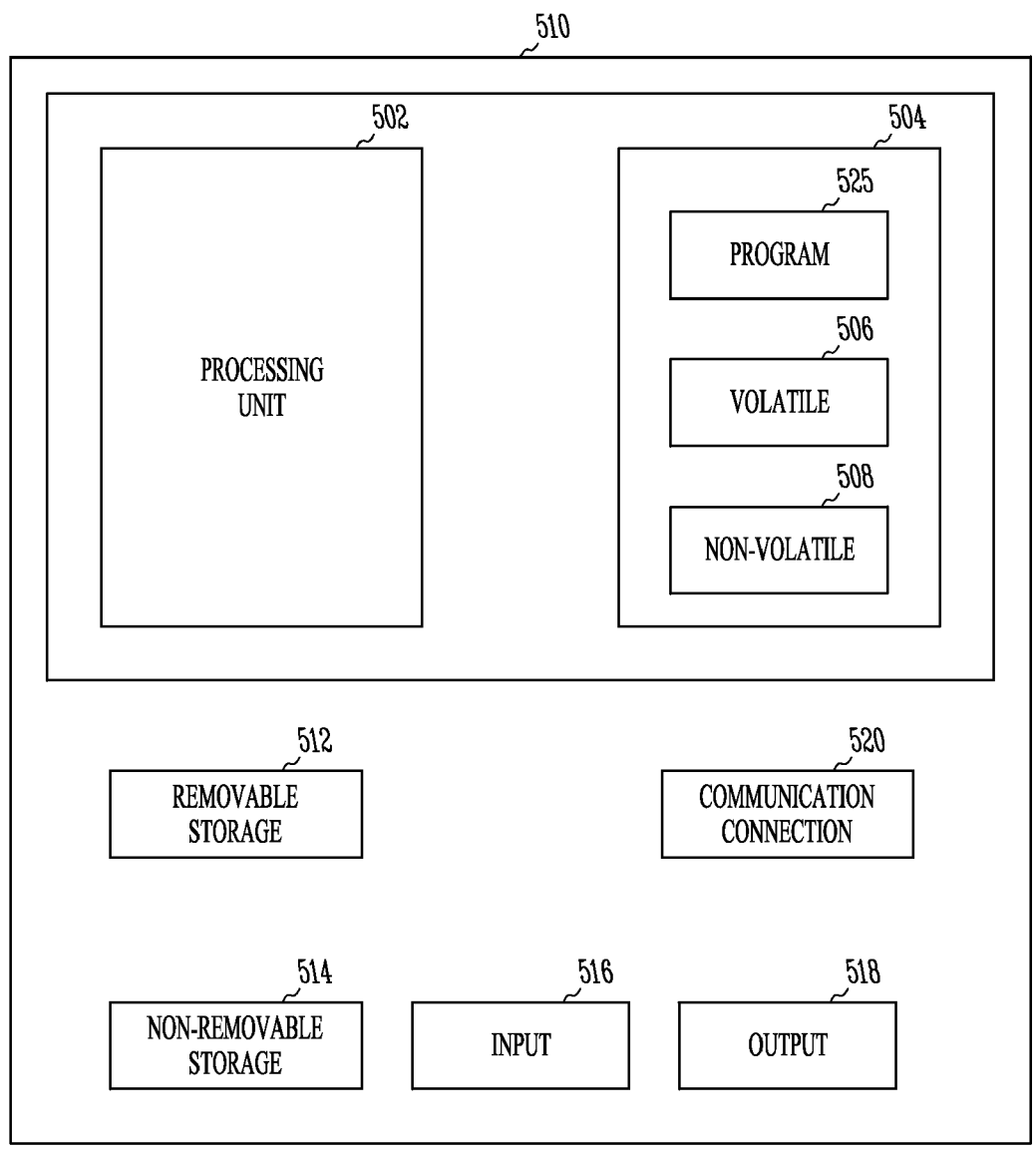
FIG. 5 is a block diagram of a typical computer system for aiding in performing processes according to an example embodiment.

A block diagram of an example computer system that executes programming for performing functions related interfacing with a user for account management, ticket purchase, production purchasing and other interactions with user is shown in FIG. 5. A general computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a computer-readable medium. For example, a computer program 525 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 510 to provide generic access controls in a COM based computer network system having multiple users and servers.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A computer system having a processor programmed to implement a method, the method comprising:
   correlating, via the computer, a unique viewing position in the venue to a viewer;
   recording an event in the venue that viewer is attending;
   creating, via the computer, a custom production of the event corresponding to the viewer; and
   making such custom production available to the corresponding viewer, via the computer, wherein the viewing position is correlated to the viewer by unique identifier and wherein the unique identifier corresponds to a purchased ticket for a predetermined seat in the venue.

2. The computer system of claim 1 wherein the viewer is identified by the processor executing facial recognition functions.

3. The computer system of claim 1 wherein the footage is marked with a notation to indicate affinity with a particular location in the forum.

4. The computer system of claim 1 wherein the processor stores a list of viewer preferences.

5. The computer system of claim 4 wherein one viewer preference specifies close-ups on one or more performers of the performance such that the one or more performers are featured in the customized production.

6. The computer system of claim 1 wherein the processor is programmed to download the customized production to a network.

7. A computer system having a processor programmed to implement a method, the method comprising:
   identifying, via the computer, locations of selected people during performance of the event;
   recording the event with multiple recording devices, wherein at least one of the recording devices records footage of at least a part of the event as a function of at least one identified location; and
   creating, via the computer, at least one production of the event that includes the recorded footage of at least a part of the event as a function of the at least one identified location, wherein multiple unique productions of the event are created for multiple selected people.

8. The computer system of claim 7 wherein at least one identified location includes a performer.

9. The computer system of claim 7 wherein the footage is marked with a notation to indicate affinity with a particular location in the forum.

10. The computer system of claim 7 wherein the processor stores a list of viewer preferences and wherein one viewer preference specifies close-ups on one or more performers of the performance such that the one or more performers are featured in the customized production.

11. The computer system of claim 7 wherein the processor is programmed to download the customized production to a network.

* * * * *